United States Patent [19]

Testa et al.

[11] Patent Number: 5,435,764
[45] Date of Patent: Jul. 25, 1995

[54] SWIMMING FLIPPER AND METHOD FOR ITS MANUFACTURE

[75] Inventors: Fabio Testa, Busalla; Giovanni B. Beltrani, Genoa, both of Italy

[73] Assignee: Technisub S.p.A., Genoa, Italy

[21] Appl. No.: 281,185

[22] Filed: Jul. 27, 1994

[30] Foreign Application Priority Data

Jul. 28, 1993 [IT] Italy .................. TO93A0562

[51] Int. Cl.6 .......................................... A63B 31/08
[52] U.S. Cl. ............................................... 441/64
[58] Field of Search ..................... 441/61, 62, 63, 64; D21/239; 428/245; 156/60, 63, 349

[56] References Cited

U.S. PATENT DOCUMENTS

| | | | |
|---|---|---|---|
| 5,163,859 | 11/1992 | Beltrani et al. | 441/64 |
| 5,304,081 | 4/1994 | Takizawa | 441/64 |
| 5,324,219 | 6/1994 | Beltrani et al. | 441/64 |
| 5,358,439 | 10/1994 | Paolo | 441/64 |

FOREIGN PATENT DOCUMENTS

| | | | |
|---|---|---|---|
| 572853 | 12/1993 | European Pat. Off. | 441/64 |
| 579046 | 1/1994 | European Pat. Off. | 441/64 |

*Primary Examiner*—Stephen Avila
*Attorney, Agent, or Firm*—Sughure, Mion, Zinn, Macpeak & Seas

[57] ABSTRACT

Swimming flipper formed by a blade and a shoe, wherein the blade comprises a body of an ethylene vinyl acetate-based polymer made by injection moulding and at least partially covered by at least one flexible and elastic film of polyethylene additioned with ethylene vinyl acetate, having a decorative and/or protective and/or mechanical function. The film is applied onto and permanently connected by chemical-thermal adhesion to the body of the blade, directly during the moulding operation thereof, being previously inserted within the mould as an insert.

17 Claims, 5 Drawing Sheets

SWIMMING FLIPPER AND METHOD FOR ITS MANUFACTURE

FIELD OF THE INVENTION

The present invention is generally related to swimming flippers, comprising a flexible but relatively rigid blade and a relatively soft shoe associated to one end of the blade, wherein the blade comprises a body of moulded thermoplastic material and wherein such thermoplastic material is for instance an ethylene vinyl acetate-based polymer.

Comprised are in the above definition flippers the blade of which is formed by a single body of moulded thermoplastic material, with the shoe (constituted by an elastomeric material or by a soft and elastic thermoplastic rubber) permanently secured by moulding over the rear end of the blade, such as generally disclosed in U.S. Pat. No. 5,163,859 in the name of the same Applicant, or wherein the shoe is constituted by an element which can be separated and coupled relative to the blade by means of a rigid automatic snap fit, such as disclosed in EP-A-0572853, also in the name of the same Applicant.

Even comprised in the said definition are flippers the blade of which comprises a main body and at least one insert, both made of thermoplastic material and permanently joined to each other by means of chemical-thermal adhesion, such as disclosed in EP-A-0579046, also in the name of the same Applicant.

More generally, falling within the above definition are all flippers presently known, the blade of which comprises a substantial portion, designated in the foregoing and in the following as "body", formed by injection moulding of ethylene vinyl acetate (EVA) and like polymeric materials.

The known flippers of the above referenced type involve a series of problems related to the nature and to the inherent characteristics of the EVA body of the flipper.

A first problem resides in that the ethylene vinyl acetate material has an extremely low resistance to abrasion. Following only a few hours of use thereof in underwater environments including rife, rocks or sand, the flipper blade is disfigured and altered, as well as made fragile owing to the numerous kerfs caused by the deepest scratches.

In order to solve this problem, expensive solutions have been proposed in the past: further to a partial covering of the blade by a rubber layer, or by the same elastomeric material which constitutes the shoe according to U.S. Pat. No. 5,163,859, already mentioned, with aesthetical and anti-kerf purposes, flippers have been produced having a blade made of thermoplastic polyurethane of various hardness, much more resistant to abrasion. These flippers however are excessively heavy, almost heavier of 40% with respect to flippers having a blade made of EVA, and the cost thereof is extremely high. Moreover, these flippers are not floating.

A second problem is related to brightness. Often the flippers are not perfectly bright either owing to imperfection in the injection mould polishing, or due to drawbacks peculiar of moulding. The market is often requiring instead extremely bright products, since they are more pleasant from the aesthetic point of view.

A third problem, to which no solution has been up to now given in the field of swimming flippers, is related to the decorating technology of the blade, by means of inscriptions or decorations or even simply with chromatic effects deriving from differently coloured areas.

The two-material flippers of the above referenced type (blade made of EVA and shoe of thermoplastic rubber), can not be decorated through the common post-decoration techniques of the thermoplastic articles. Both materials are in fact refractory to these techniques:

screen printing and buffer paint methods are not feasible, since the relative inks do not adhere to the subject materials. Expensive preliminary treatments (primers, corona and flame treatments) are only to be considered as palliatives possibly enabling some adhesion, which is however too weak;

hot impression with colouring ribbons might be adopted, but also in this case adhesion is weak, and above all resistance to scratching of the impressed decoration is most scarce;

varnishing is extremely expensive, since it is necessary to solve the problems related to flexibility of the flipper and to the consequent need of resisting to numerous deflection cycles, and above all it does require a technological further step following moulding, which anyhow has to be performed outside the normal production line, with extremely relevant transportation and handling costs, and remarkable added producing time;

hot transfers, to be applied on the finished article, are also very expensive. Moreover adhesion thereof requires an accurate surface preparation, and is in any case unreliable.

The above disclosed techniques (screen and buffer printing, hot impression, varnishing, hot transfer) can be considered as comprised among the so called "a posteriori decoration" typologies, in the sense that they are carried out in a second step on the already moulded article. Therefore, further to the already mentioned drawbacks, they involve additional costs. Further to the decoration time, which is to be added to the formation (injection moulding) time, the handling time for the decoration of the flippers and for subsequent stocking thereof are to be computed. The risk of producing scraps is huge, owing to the difficulty of positioning the articles beneath the decoration equipment.

The systems previously invented by the Applicant to provide a solution to the problem of decorating and/or protecting the blade consists, in the case of U.S. Pat. No. 5,163,859 already mentioned, of a partial covering of the blade, by means of the same thermoplastic rubber deriving from overmoulding of the shoe. This enables to create inscriptions and decorations, for instance as high or bas relieve, however only of two colours and limited to simple and gross designs. This technology is expensive, and thus can only be applied to flippers having a high commercial value.

Another system, proposed by the Applicant in EP-A-0579046 already mentioned, consists of obtaining the decorations by means of thermoplastic material inserts of different colours, pre-moulded and subsequently joined to the remaining portion of the blade, or post-moulded within respective recessed portion thereof. Also this system has the same limits of the solution according to U.S. Pat. No. 5,163,859.

In different technical fields it has been proposed, in order to avoid the complex problems related to decoration a posteriori of various articles, and in any case of simple shapes, the technology known under the denomination "in-mould". This technique provides the use of a pre-decorated film, comparable to the hot-impression ribbon, which is introduced within the mould and, at the time of injection, decorates the article by means of deposition and adhesion of the decorations carried by the film.

This film is constituted as a rule as a sufficiently thick and almost inextensible polyester support, which is in any case such as to avoid adhesion thereof to the polymer of which the article will be constituted. In the phase of preparation of the film, on the inner face thereof a layer of pigments, ink, metal powder etc. is deposited, which is treated so as to guarantee non-adhesion to the basic polymer of the article. During application, when the mould is open, the film is positioned therein, and subsequently the mould is closed and the polymer is injected. When the mould is again opened, the moulded article is already incorporating the decoration (pigments and inks according to the envisaged graphical form), while the support film, deprived of the decoration, is separated and disposed of, or recycled.

This technique can not be applied to flippers having a blade made of EVA, and on the other hand it would not solve the problems related to decoration and scratching thereof, due to the following reasons:

- films are available, which are prepared for rigid polymers such as ABS, polypropylene and the like, not for EVA/thermoplastic rubber;
- the adhesion of the pigments onto EVA/thermoplastic rubber is anyway extremely weak and is not protected against abrasion;
- the existing films are inextensible and, therefore, not adapted to be spread onto more or less deeply sculptured mould surfaces, since they would be subject to tearing during injection;
- no protective layer would remain on the decorated surface of the flipper, and thus the scratching problems of the flipper and decoration thereof would not be solved;
- the cost of the film is extremely high, particularly considering the wide surfaces of flippers: the decoration would cost more than the flippers themselves.

SUMMARY OF THE INVENTION

The object of the present invention is to give a solution to the above-referenced problems, related to the flippers of the type set-forth at the beginning: decoration, brightness and resistance to abrasion, in a simply, effective and cheap way.

According to the invention, this object is achieved by virtue of a flipper of the type defined in the above, comprising a flexible but relatively rigid blade and a relatively soft shoe associated to one end of the blade, wherein the blade comprises a body of thermoplastic moulded material, said thermoplastic material being an ethylene vinyl acetate-based polymer, the essential feature of which resides in that said body of the blade is at least partially covered by at least one flexible and elastic film of a thermoplastic material consisting of polyethylene admixtured with ethylene vinyl acetate, said at least one film being permanently connected to said body by chemical-thermal adhesion.

The invention is also directed to a method for the manufacture of a flipper of the above mentioned type, comprising the steps of producing the blade by forming at least one body of an ethylene vinyl acetate-based polymer injected into a moulding system, characterized in that at least one film of a thermoplastic material consisting of polyethylene admixtured with ethylene vinyl acetate is introduced within the moulding system before the formation of the body, and said film is permanently secured to said body by chemical-thermal adhesion following injection, so as to cover at least partially said body.

The invention, which gives a solution simultaneously both to the scratching problem, and to the decoration problem, and as well to the brightness of the flipper body problem, originated from the consideration that an unfinished product which is extremely suitable for this decoration/protection function is to be found worldwide quite easily: this is the polyethylene film employed in enormous amounts for packings, packagings, bag production etc. These films are actually composed of polyethylene admixtured with ethylene vinyl acetate normally between 3-4% in weigh or more, so as to increase flexibility thereof. Such a film, placed within a flipper mould in a suitable position, during injection is perfectly welded to the moulded article, both to the EVA body of the blade and possibly also to the thermoplastic rubber of the shoe. This film can easily be previously decorated, and the outer surface thereof may also be covered with further stretch resistant layers. Consequently, the flipper according to the invention comes out from the mould decorated and protected, with a negligible additional cost with respect to the whole moulding cost.

The essential difference between the system proposed by the invention and the techniques previously disclosed as "in mould" decorations essentially consists in that, according to the latter, the only function of the film is to temporarily support the inks constituting the decoration: once having accomplished this task, when the mould is opened, the decoration has already abandoned the film, which is than disposed of or possibly re-used.

According to the present invention, instead, the film is composed so as to firmly and permanently adhere to the flipper, during injection of the flipper blade. This film not only permanently incorporates therewith the decoration, but also remains definitively joined to the flipper, thus effectively protecting the surface thereof, without any need of glueing or like additional adhesion means.

In comparison with the "a posteriori decoration" techniques, previously disclosed, the system according to the invention leads to the advantage of a remarkable process economy and of a great easiness in the decoration technology of the film per se.

BRIEF DESCRIPTION OF THE DRAWINGS

The invention will now be described in detail with reference to the appended drawings, provided purely by way of non-limiting example, in which.

DETAILED DESCRIPTION OF THE INVENTION

Figure 1:
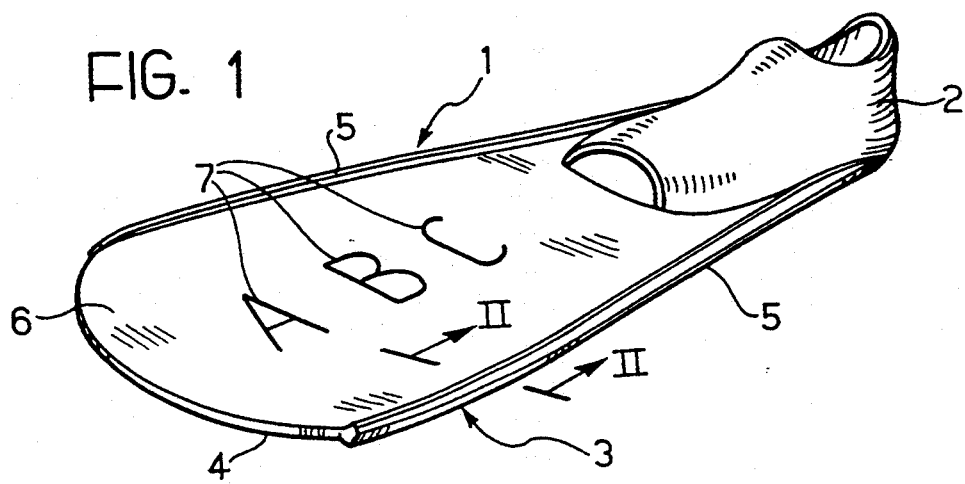
FIG. 1 is a diagrammatic perspective view of a swimming flipper according to the invention.
Figure 2:
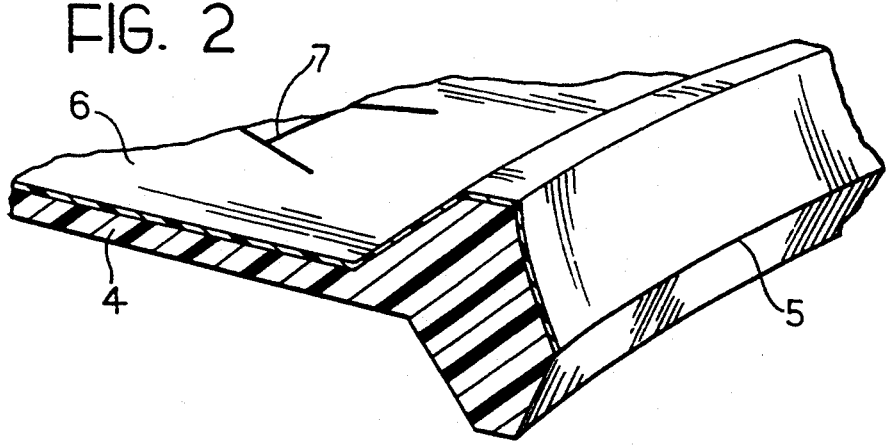
FIG. 2 is a sectioned and enlarged view along line II—II of FIG. 1.

Referring initially to FIGS. 1 and 2, reference numeral 1 generally indicates a swimming flipper according to a first embodiment of the invention, which is formed by a monolithic body defining at one end a shoe 2 which is connected to a blade generally designated as 3.

In the case of the shown example the shoe 2 is of the type having an integral rear wall: it however to be pointed out that this rear wall could be suppressed, and an adjustable strap of known type could be substituted therefor. Moreover, the shoe 2 might also be constituted by a member adapted to be separated by the blade 3 and to be connected thereto by means of a quick snap-fit system.

The shoe 2 is made of an elastomeric material or, more conveniently, of s soft and elastic thermoplastic rubber. The shoe 2 is secured, in a generally conventional way, to the rear portion of the blade 3.

The blade 3 is constituted, in the case of the illustrated example, by a single body of moulded plastic material, and in particular of ethylene vinyl acetate (EVA). However it must be pointed out that, in alternative, the blade 3 might be formed by two or more distinct elements, made of the same material or of materials having chemical affinity, permanently joined to each other by chemical-thermal adhesion.

According to the shown example, the body 4 of the blade 3 has an elongated shape with two thickened lateral longitudinal members 5. Naturally the design may be different, as it will be clarified hereafter in the description of further embodiments.

According to the invention, a covering film 6 is applied on the body 4 of the blade 3 and is permanently secured to the body by chemical-thermal adhesion: the primary function thereof is to enable decoration of the blade 3, for instance by means of inscriptions or wordings 7, or through ornamental designs even only in connection with the chromatic point of view.

The film 6 has a reduced thickness as compared with the total thickness of the body 4, and has the peculiarity on one hand of having a chemical affinity with the ethylene vinyl acetate of the body 4, and on the other hand to be provided of a remarkable elasticity or flexibility.

More particularly, the film 6 is a film of polyethylene admixtured with EVA, at an amount comprised between 1 and 30% by weight, and preferably between 2 and 18% by weight, of the type widely employed for instance for the manufacture of plastics bags and the like. It is therefore a material which can be easily acquired and, above all, is extremely cheap.

Figure 11:
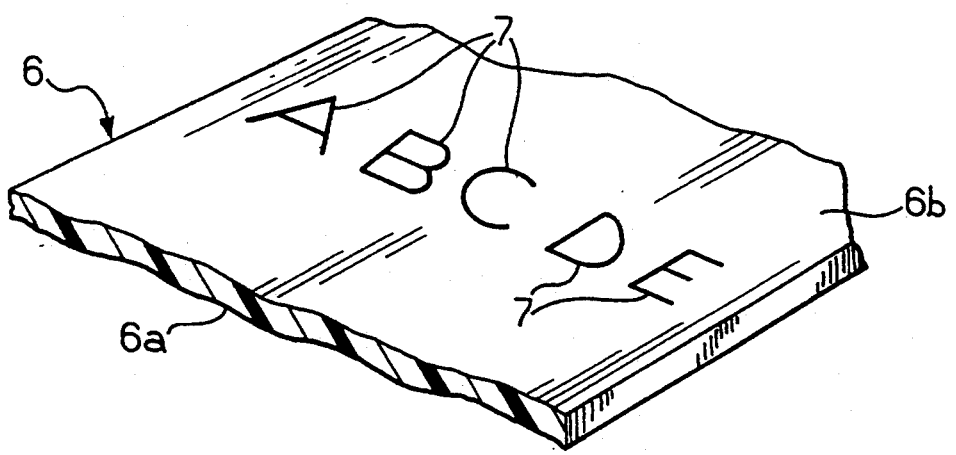
FIG. 11 is a perspective and fragmentary view of a detail of the flipper according to the invention.

FIG. 11 shows in better detail a portion of the film 6: it is a mono-layer film the inner face 6a of which, i.e. the one adhering on the body 4, is untreated to the aim of avoiding any limitations to the adhesion on the body 4, in the way which will be clarified in the following, and the opposite face 6b of which is pre-treated so as to help decoration, for instance by means of corona effect. The face 6b is decorated for instance with inscriptions 7, by means of any suitable conventional method (screen printing, flexo-graphic printing, rotogravure etc).

In addition to the primary decorating function, the film 6 performs two additional important tasks: on one hand it gives a brightness effect to the area of the blade 3 on which same is applied, which is welcome from the aesthetic point of view, and on the other hand it performs a protective effect against abrasion and scratching: as it is known, the intrinsic resistance of EVA to abrasion and scratching is absolutely poor.

Figure 12:
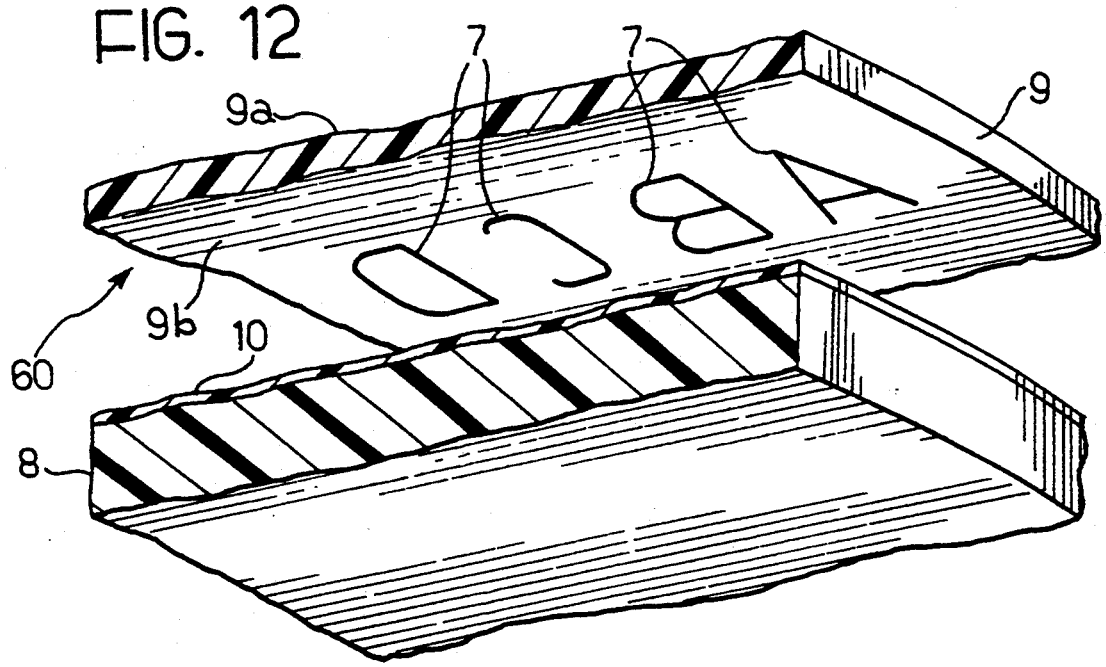
FIG. 12 shows a variant of FIG. 11.

In order to obtain an even better protective effect, not only in connection to the body 4 but also as far as the decoration applied thereon is concerned, a multi-layer coupled film can be conveniently employed, such as that indicated as 60 in FIG. 12. In this case the film 60 comprises an inner layer 8 of polyethylene admixtured with EVA, and an outer layer 9 of a material which is more resistant to abrasion and also easy to decorate, for instance polyester, polyamide or the like, normally transparent. The outer layer 9 may have a lucid outer face 9a, and the inner face 9b thereof i.e. the one which is coupled to the inner layer 9, is decorated by inscriptions 7 or the like. The two layers 8 and 9 are coupled therebetween by rolling, with the interposition of and adhesive layer 10, and then the film 60 is applied onto the body 4 of the blade 3 such as clarified in the following, so that the decoration 7 is comprised between the two layers 8 and 9, and thus protected, while at the same time being visible from outside by virtue of the transparency of the outer layer 9.

A further intermediate layer, not shown in the drawings, may additionally be interposed between the two layers 8 and 9, for decoration purposes and in order to enhance the elastic flexional behaviour of the film 60. This intermediate layer may be constituted, for instance, by a thin aluminium plate or the like, or by a net of carbon fibres, or anyway by any kind of layer of a material selected so as to modify the flexure performance of the flipper, improving it in terms of power and propulsive efficiency. It is anyhow contemplated within the scope of the present invention that the film layer, be it simple, coupled or multiple, with or without intermediate layers, may be employed to the aim of modifying the flexional behaviour of the blade. It should not be neglected, in fact, that the film, which is adherent to one of the two surfaces (upper or lower) of the blade and which is provided with a module of elasticity different from that of the blade itself, may contribute to appreciably modify section by section the moment of inertia thereof. For instance, the shrinkage after moulding of the blade may tend to permanently "spoon" deform the blade itself, with consequent effects of canalisation of the water flow in use, or may impart to the film a permanent tensioning, which in principle will make the flipper more sprung.

Reverting to FIGS. 1 and 2, the film 6 (or 60) is applied so as to entirely cover the upper face of the body 4 and the corresponding areas of the two lateral longitudinal members 5.

Figure 3:
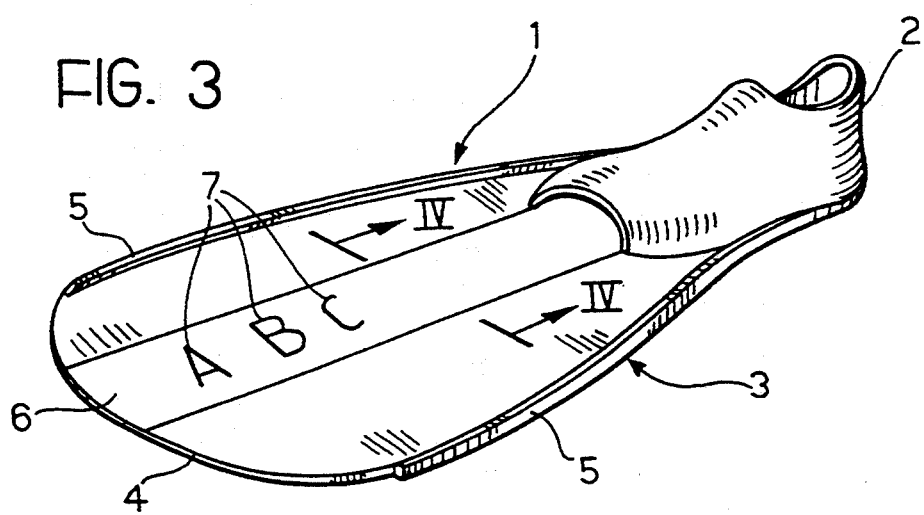
FIG. 3 shows a first variant of FIG. 1.
Figure 4:
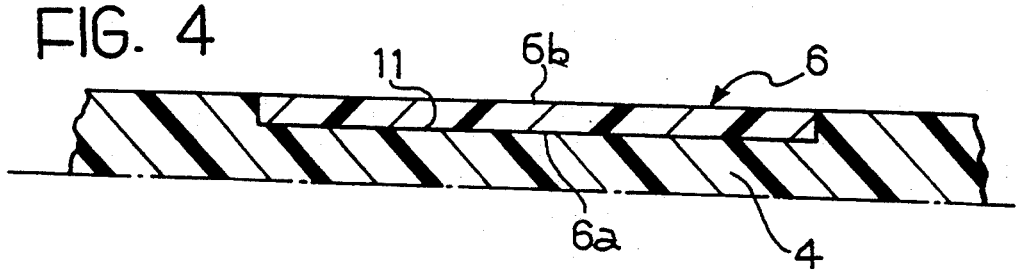
FIG. 4 is a sectioned and enlarged view along line IV—IV of FIG. 3, FIGS. 5 and 6 are two enlarged, partial and perspective views showing further variants of the flipper according to the invention.

According to the variant shown in FIGS. 3 and 4, the film with the decorations 7 covers only an area, for instance a central band, of the upper face of the body 4. In this case, by virtue of the moulding method, the film will be conveniently (and automatically) seated along a corresponding depression 11 of the body 4 (FIG. 4), whereby its outer face 6b is flush with the upper surface of the body 4, without any thickness rise. In this way the film 6 (or 60) shall be unperceived to the touch, further ensuring an efficient adhesion along the time so as to avoid release of the peripheral edges of the film.

Figure 9:
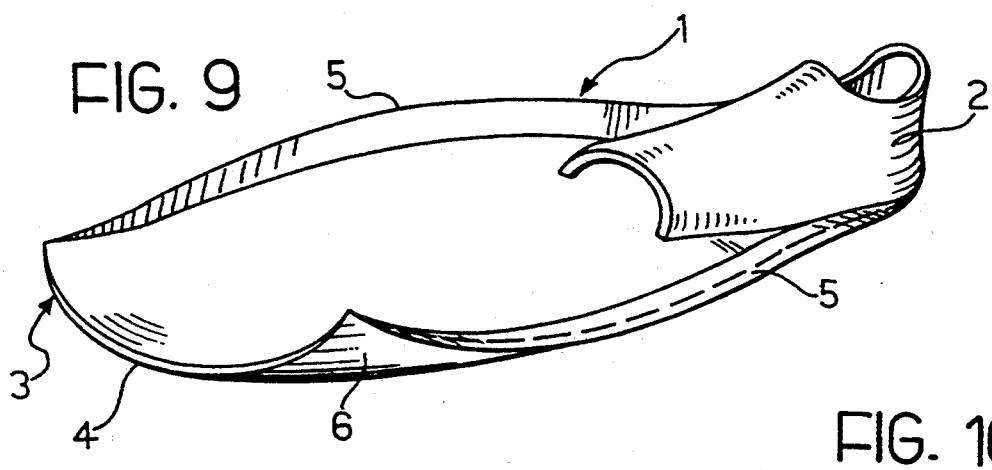

According to a further alternative, depicted in FIG. 9, the film 6 (or 60) may be applied onto the lower face of the body 4.

In this case the film 6 (or 60), instead of being provided with decorations, may simply have a different colour with respect to that of the body 4. It is thus possible to obtain flippers with the upper surface of one colour, and the lower face of a different colour, for aesthetical or event to camouflage purposes.

Figure 8:
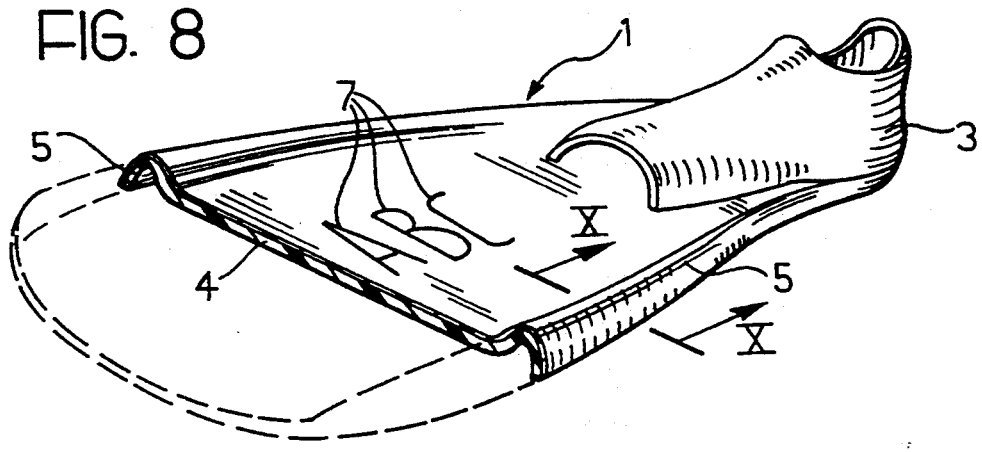
Figure 10:
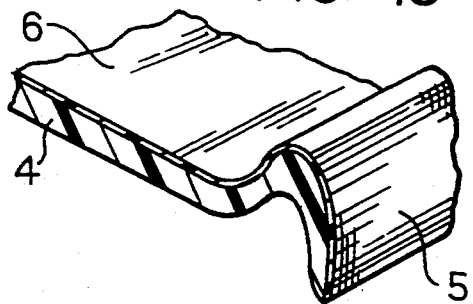
FIG. 10 is a sectioned and enlarged view along line X—X of FIG. 8.

In the case of FIGS. 8 and 10 the arrangement is similar to FIG. 1, with the film 6 (or 60) covering the entire upper surface of the body 4 of the blade 3 and also the back of the longitudinal members 5, which in this case may conveniently have a concave configuration.

According to a further embodiment, not shown in the drawings, the body 4 is covered by the film 6 (or 60) entirely, i.e. both on the upper face and on the lower face thereof. In this case the protective effect is complete, and the whole blade 3 may be provided with a pleasant bright aspect, independently of any imperfections of the mould polishing or of localised opacities thereof which might derive from inadequate parameters of the injection moulding.

According to a further variant, not shown in the drawings, the body 4 of the blade 3 which is decorated and/or protected by the film 6 (or 60) may be constituted, instead of the total or partial surface of the blade 3, by an insert pre-moulded in a suitable mould with the respective film, and subsequently placed within the final mould and then embodied in the final flipper moulding.

According to a further variant, the film 6 (or 60) may be applied in the form of separate pieces or sheets onto localised areas of the body 4 of the blade 3.

It is important, in connection with the application method of the film 6 (or 60) disclosed hereinafter, that the areas of the body 4 of the blade 3 intended to receive this film have no sharp edges or rough changes of thickness, in order to avoid tearing thereof upon application. The shape of the body 3 shall be actually designed so that the EVA injection flow has the effect to spread the film 6 (or 60) onto to the mould surface, whereby the film, by virtue of its own flexibility and elasticity, is stretched and laid over the entire mould unevenness.

Figure 5:
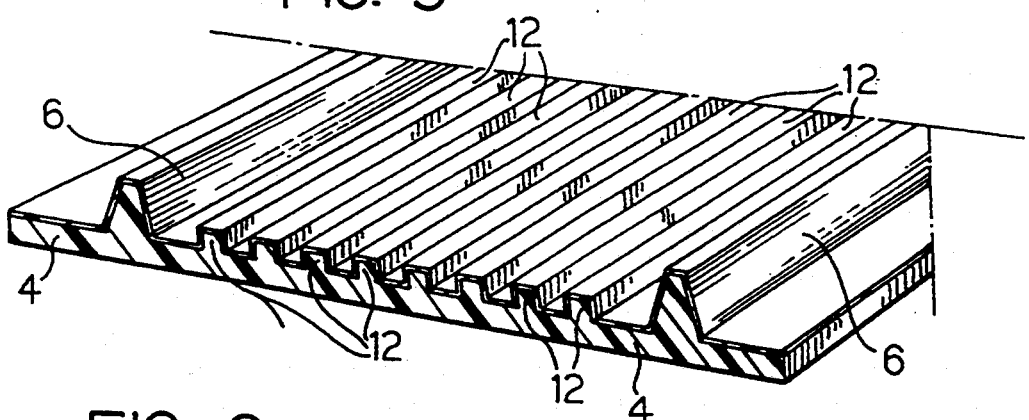
Figure 6:
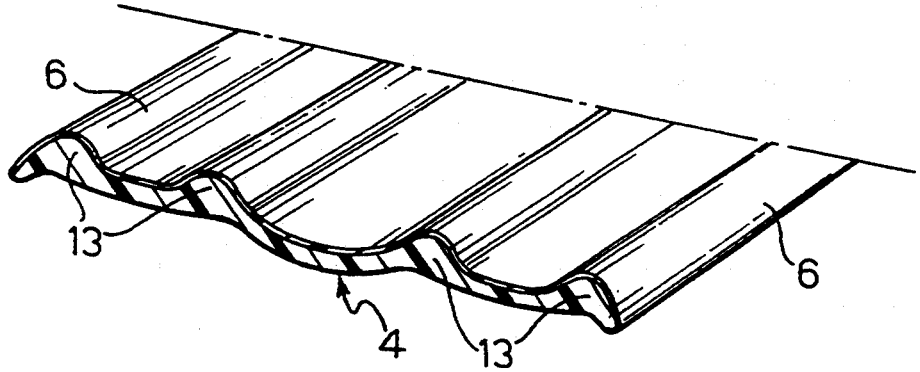
Figure 7:
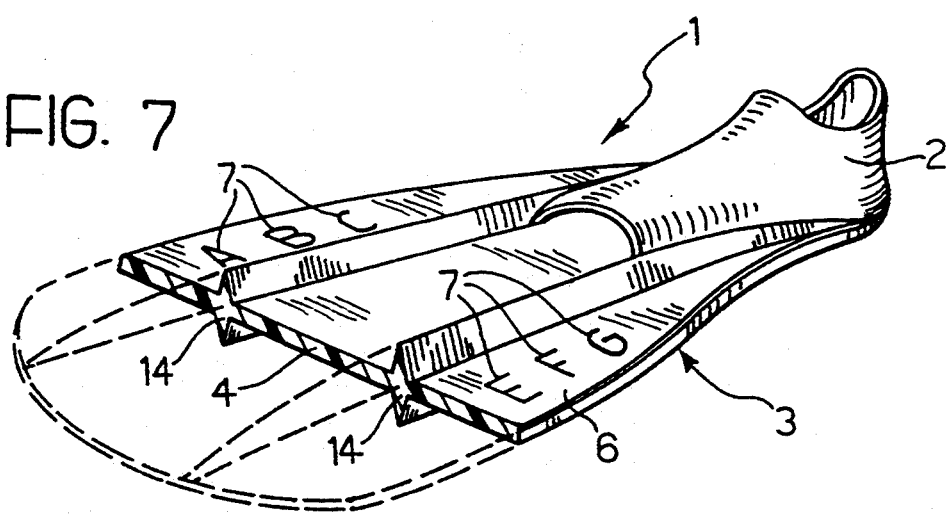
FIGS. 7, 8 and 9 show further variants of FIG. 1.

From this point of view, in addition to the substantially planar configurations shown in FIGS. 1, 3, 8 and 9, configurations of the type depicted in FIGS. 5, 6 and 7 are also envisaged.

In the first case the body 4 is formed on its upper face with longitudinal ribs 12, which can be covered by an ultra-elastic film 6 (or 60).

The arrangement shown in FIG. 6, wherein the body 4 is provided with undulations having a wide curvature radius, is more suitable in the case of less elastic films.

The arrangement of FIG. 7, in which the body 4 is formed with two thick central longitudinal members 14, produces upon moulding of the blade 3 a higher flowing speed of the material injected in the area comprised between these longitudinal members 14, which might involve a convergency of the flow and thus curling of the film possibly placed between the two central longitudinal members. This design is therefore more suitable for the application of a pair of films 6 (or 60) in the areas of the body 4 comprised between the two longitudinal members 14 and the lateral edges of the blade 3.

Instead, the arrangements shown in FIG. 8 enables to avoid upon moulding any flow confluence of the injected material, facilitating to the contrary a divergent flow thereof. This conformation is thus more suitable for the complete covering of the upper face of the body 4 by the film 6 (or 60), which is in this way efficiently stretched upon moulding.

As already clarified in the above, the fundamental requirements of the selected films consist of flexibility and elasticity, which are peculiar of conventional films of polyethylene admixtured with EVA, readily available on the market. These characteristics are essential not only in connection with application of the film onto the body 4 of the blade 3, so as to copy any surface unevenness of the respective mould, but also in order to follow the flexional deformation which the flipper is subject to in use. Under this point of view, the monolayer film 6 is certainly more suitable, even if it ensures a lower degree of surface protection of the body 4 and, above all, of the decorations applied thereon. In this connection the multilayer coupled film 60 is instead preferred due to a more efficient preservation of the decoration and to the better protection thereof.

The method for the manufacture of the flipper 1 according to the invention will now be disclosed with reference to FIGS. 13 through 16.

The first step consists of the preparation of the film 6 (or 60) with the respective decorations made according to the conventional methods disclosed in the above.

For the manufacture of the flipper 1 a conventional injection moulding equipment is employed, constituted, in a generally known way, by a first mould section A and a second mould section B, formed with respective cavities C, D intended to be filled with the thermoplastic material (EVA) for the formation of the body 4 of the blade 3. The first mould section A is further provided with a foot body E corresponding to the shape of the shoe 2.

Reference F diagrammatically indicates a reel for the unwinding of a continuous web of film 6 (or 60) which is guided across the mould A along the area thereof corresponding to the respective cavity C, and to the free end of which a motor-driven gripper-type entrainment and tensioning device, diagrammatically indicated as G, is associated. This arrangement enables the automatic positioning, in synchronism with the closing-injection-opening cycle of the injection equipment, of a length of film 6 the size of which is such as to cover the selected application area of the body 4 of the blade 3.

Obviously positioning of the film length can be performed by different means and also manually, according to what will be clarified in the following.

Figure 13:
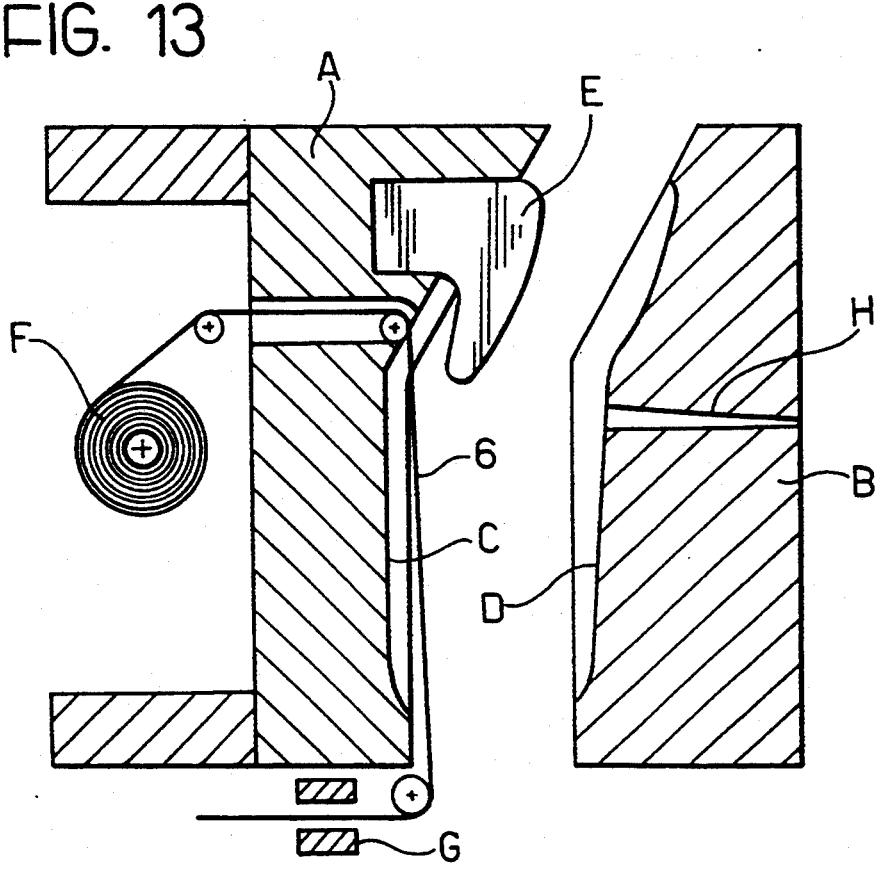
FIG. 13 is a diagrammatic and sectioned view of a mould intended to be used for the manufacture of the flipper according to the invention.

The positioning of the length of film 6 is such that the decorated outer face 6b of the monolayer film 6 of FIG. 11, or the outer face 9a of the protective layer 9 of the multilayer film 60 according to FIG. 12, is placed during the injection phase against the wall of the cavity C of the mould A, i.e. so that the lower face 6a of the monolayer film 6, or that of the inner layer 8 of the multilayer film 60, is facing towards the injection nozzle of the moulding equipment, diagrammatically indicated as H in FIG. 13.

In general the length of film 6 placed in correspondence of the cavity C may be longer or shorter with respect to that of the cavity. In the first case the edges of the mould section A and of the mould section B shall clamp the film length, following closure therebetween, while in the second case suitable positioning means, not shown but within the knowledge of the man skilled in the art, may be provided.

Following closure between the mould section A and the mould section B, the thermoplastic material (EVA) intended to generate the body 4 of the blade 5 is injected, and subsequently the thermoplastic rubber for the overmoulding of the shoe is possibly injected.

During injection, the inlet flow of the polymer urges the length of the film 6 (or 60) arranged between the mould section A and the mould section B, against the wall of the cavity C. By virtue of the flexibility, extendibility and elasticity thereof, the film is able to copy any possible unevenness of the cavity C which, as previously explained, shall have no sharp edges or excessively rough thickness changes.

Following cooling, the polymer will be perfectly sticked onto the surface of the film 6 (or 60), since the chemical composition of the latter has an affinity or is identical to that of the polymer which is employed for the body 4 of the blade 3 (EVA) and/or to that possibly employed to form the shoe 2 (elastomeric thermoplastic material admixtured with EVA). Upon drawing from the mould, the flipper is thus already decorated and covered by a protective layer, precisely defined by the film 6 (or 60), which besides carrying the decoration, makes stretch-resistant the entire surface of the flipper over which it is applied.

If the length of the film 6 (or 60) is wider than the cavity C of the mould A, a subsequent trimming step is then necessary, so as to remove any scraps. This operation is facilitated by the fact that the closure edges between the mould sections A and b already perform an initial die-cutting action.

The arrangement shown in FIG. 13 corresponds to covering of the upper face of the body of the blade 3, for instance according to the configurations depicted in FIGS. 1, 5, 6 and 8. It is evident that the positioning of the film 6 may be varied as a function of the area to be covered: for example, in the case of the configuration according to FIG. 9, same will be positioned in front of the cavity D of the mould section B.

In any case, as already clarified in the above, the conformation of the article shall be necessarily designed so that the flow of the injected polymer effects stretching of the film 6 (or 60) over the opposite surface of the mould, without producing any negative effect such as crumpling of the film itself. To such effect, as already previously clarified, the conformation according to FIG. 8 is considered as the most suitable, since it is able to produce a diverging flow of the injected material and consequent film stretching.

In case it is intended to decorate not the entire upper (or lower) surface of the body 4 of the blade 3, but only a set area (for instance the central band according to the embodiment of FIGS. 3 and 4 or the lateral bands according to FIG. 7), the film 6 (or 60) shall have to be die-cut in a corresponding size, or more simply the reel F shall have to be narrower or possibly double. The preferred embodiment of a central area according to FIGS. 3 and 4 is matching the need that the injection flow does not shift or crumple the film, but instead effects stretching thereof.

Figure 14:
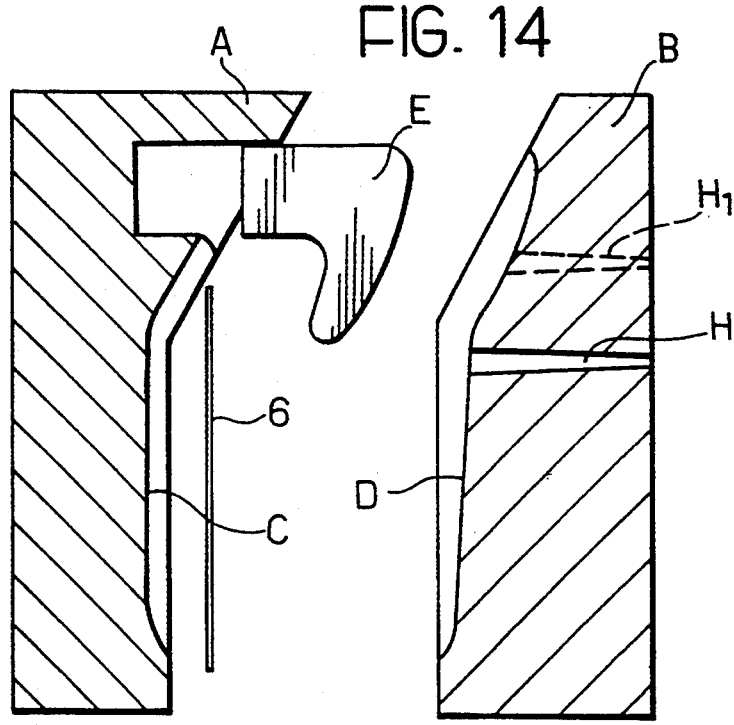
FIGS. 14 and 15 show a first and respectively a second variant of FIG. 13

FIG. 14 shows another arrangement of the injection equipment, wherein a sheet of film 6 (or 60) already cut in the set size is positioned between the mould section A and the mould section B. These film sheets may be drawn from a suitable stock and everytime positioned such as illustrated, for instance with the aid of a vacuum system loader apparatus. In this case, since unlike the case of FIG. 13 the film sheet can not be maintained in a stretched condition following closure of the injection equipment, it may be useful to arrange the injection nozzle H in the position indicated as $H_1$. This avoids any problems of melting or deformation of the sheet of film 6, since the impact of the injected polymer in this case is not direct, by is made indirect via the sole of the foot insert E.

Figure 15:
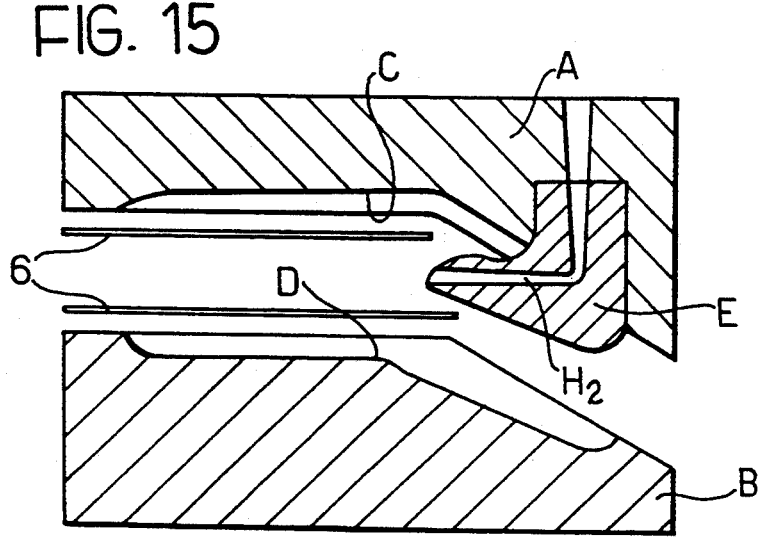

FIG. 15 shows an arrangement for the covering of both faces of the body 4 of the blade 3, with a pair of opposed sheets of film 6 (or 60), or possibly with two lengths of a single folded film web. The injection flow in this case shall be conveniently directed to the interspace between the cavities C and D of the mould section A and of the mould section B, respectively, normally through a passage $H_2$ formed within the foot insert E, so that each sheet of film 6 (or 60) lies down against the wall of the respective cavity.

Figure 16:
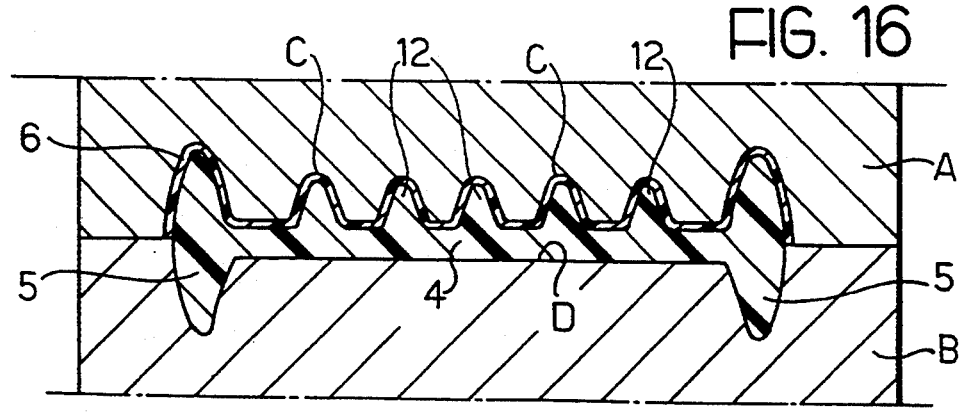
FIG. 16 is a diagrammatic, sectioned and enlarged view of the mould of FIG. 13 during the manufacture process of the flipper according to the invention.

Lastly FIG. 16 diagrammatically shows a body 4 of a blade 3 similar to that of FIG. 5, following the injection step and before opening between the mould section A and the mould section B. As it is apparent, the film 6 (or 60) covers the entire upper face of the body 4, copying the configuration of the longitudinal ribs 12, as well as the upper portion of the two lateral longitudinal members 5. The free portions of the films 6 (or 60) projecting laterally of the two longitudinal members 5 shall have to be subsequently cut, manually or by means of a suitable powered apparatus within the knowledge of the man skilled in the art.

Naturally the details of construction of the flipper and the modes for the manufacture thereof may be widely varied with respect to what has been disclosed and illustrated, without thereby departing from the scope of the present invention, such as defined in the appended claims.

We claim:

1. Swimming flipper, comprising a flexible but relatively rigid blade and a relatively soft shoe associated to one end of the blade, wherein the blade comprises a body of thermoplastic moulded material, said thermoplastic material being an ethylene vinyl acetate-based polymer, and at least one flexible and elastic film of a thermoplastic material consisting of polyethylene admixtured with ethylene vinyl acetate, said at least one film covering at least partially said blade body and being permanently connected thereto by chemical-thermal adhesion.

2. Flipper according to claim 1, wherein the admixtured amount of ethylene vinyl acetate of said at least one film is comprised between 1 and 30% by weight, preferably between 2 and 18%.

3. Flipper according to claim 1, wherein said at least one film is connected to the body of the blade upon moulding thereof.

4. Flipper according to claim 1, wherein said at least one film is a monolayer film.

5. Flipper according to claim 4, wherein the monolayer film has an untreated inner face for connection to the body of the blade, and an outer face treated to receive a decoration.

6. Flipper according to claim 4, wherein the monolayer film has an untreated inner face for connection to the body of the blade, and a decorated outer face.

7. Flipper according to claim 1, wherein said at least one film is a multilayer coupled film having an inner untreated layer for connection to the body of the blade, and at least one outer transparent layer having an inner face connected to said inner layer and decorated.

8. Flipper according to claim 7, further comprising an intermediate layer between said inner and outer layers.

9. Flipper according to claim 1, wherein said body of the blade has an upper face and a lower face, and wherein said at least one film covers the entire upper face of the body of the blade.

10. Flipper according to claim 1, wherein said body of the blade has an upper face and a lower face, and wherein said at least one film covers at least partially both faces of said body of the blade.

11. Flipper according to claim 1, wherein said body of the blade has at least one face with a depressed central longitudinal area, and wherein said at least one film covers said depressed central longitudinal area, whereby said film is embedded in said body and is flush with said at least one face thereof.

12. Method for the manufacture of a swimming flipper having a flexible but relatively rigid blade and a relatively soft shoe associated to one end of the blade, said method comprising the steps of producing the blade by forming at least one body of an ethylene vinyl acetate-based polymer injected into a moulding system, wherein at least one film of a thermoplastic material consisting of polyethylene admixtured with ethylene vinyl acetate is introduced within the moulding system before the formation of said body, and said film is permanently secured to said body by chemical-thermal adhesion following injection, so as to cover at least partially said body.

13. Method according to claim 12, wherein the injection flow of the ethylene vinyl acetate during the moulding step of said body of the blade is oriented in such a way that said at least one film lies against an area of said moulding system opposed to an injection nozzle.

14. Method according to claim 13, wherein the injection flow of the ethylene vinyl acetate during the moulding step of said body of the blade is oriented so as to spread and stretch said at least one film against said area of the moulding system.

15. Method according to claim 12, wherein said at least one film is drawn into said moulding system from a continuous web reel.

16. Method according to claim 12, wherein said at least one film is inserted within the moulding system in the form of die-cut and shaped sheets maintained in position therein before injection.

17. Method according to claim 12, wherein said body of ethylene vinyl acetate at least partially covered by said at least one film is employed as a blade insert intended to be subsequently placed within a further moulding system for the completion of the blade.

* * * * *